US012807301B2

(12) United States Patent
Milliere et al.

(10) Patent No.: US 12,807,301 B2
(45) Date of Patent: Nov. 24, 2026

(54) TAIL FIN ASSEMBLY FOR AN AIRCRAFT COMPRISING PIPING AT THE FRONT OF THE TAIL FIN

(71) Applicant: Airbus Operations SAS, Toulouse (FR)

(72) Inventors: Jérôme Milliere, Toulouse (FR); Andrea Romero Hernandez, Toulouse (FR); Marc Casteran, Toulouse (FR); Samuel Dumas, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/381,572

(22) Filed: Nov. 6, 2025

(65) Prior Publication Data

US 2026/0145777 A1 May 28, 2026

(30) Foreign Application Priority Data

Nov. 26, 2024 (FR) .................................. FR2413013

(51) Int. Cl.
*B64C 5/06* (2006.01)

(52) U.S. Cl.
CPC ...................................... *B64C 5/06* (2013.01)

(58) Field of Classification Search
CPC ........... B64C 5/06; B64C 5/02; B64C 1/0685; B64C 21/04; B64C 21/06; B64C 21/02; B64C 2230/04; B64C 2230/22; B64C 2230/06; B64C 3/28
See application file for complete search history.

(56) References Cited

U.S. PATENT DOCUMENTS

| | | | | |
|---|---|---|---|---|
| 5,899,416 | A | 5/1999 | Meister et al. | |
| 9,193,443 | B2 * | 11/2015 | Voege | B64C 3/00 |
| 9,623,959 | B2 * | 4/2017 | Schrauf | B64C 5/06 |
| 10,472,052 | B2 * | 11/2019 | Heller | B64C 5/02 |
| 10,814,962 | B2 | 10/2020 | Gerber | |
| 11,052,991 | B2 * | 7/2021 | Eilken | B64C 5/06 |
| 2013/0001356 | A1 * | 1/2013 | Llamas Sand N | B64C 5/06 244/54 |
| 2013/0082142 | A1 | 4/2013 | Li et al. | |
| 2015/0343702 | A1 | 12/2015 | Garcia et al. | |
| 2021/0371088 | A1 * | 12/2021 | Höft | B64C 5/06 |
| 2023/0086167 | A1 | 3/2023 | Milliere et al. | |

FOREIGN PATENT DOCUMENTS

EP 2886452 B1 9/2017

OTHER PUBLICATIONS

French Search Report for corresponding French Patent Application No. 2413013 dated May 26, 2025; 6 pages.

* cited by examiner

*Primary Examiner* — Arfan Y. Sinaki
(74) *Attorney, Agent, or Firm* — Greer, Burns & Crain, Ltd.

(57) ABSTRACT

A tail fin assembly for an aircraft having a tail fin with a front side-member, a plurality of ribs, wherein the ribs are positioned along the front side-member, wherein each rib has a foot which is integral with the front side-member and a head which is integral with the foot, at least one piece of piping extending along the front side-member and at the rear of each head, and a housing which is secured on the heads.

11 Claims, 8 Drawing Sheets

TAIL FIN ASSEMBLY FOR AN AIRCRAFT COMPRISING PIPING AT THE FRONT OF THE TAIL FIN

CROSS-REFERENCES TO RELATED APPLICATIONS

This application claims the benefit of French Patent Application Number FR2413013 filed on Nov. 26, 2025, the entire disclosure of which is incorporated herein by way of reference.

FIELD OF THE INVENTION

The present invention concerns a tail fin assembly for an aircraft, wherein said tail fin assembly comprises piping which ensures the transport of a gas, such as dihydrogen, along the leading edge of a tail fin. The invention also concerns an aircraft comprising a tail fin assembly of this type.

BACKGROUND OF THE INVENTION

In an aircraft, it is known to use tanks to contain fluids such as, for example, dihydrogen under pressure. When the pressure increases too much, it is desirable to discharge the gaseous dihydrogen to the exterior of the aircraft. For this purpose, it is known to use piping which is connected fluidically between the tank and a nozzle which opens on the exterior of the aircraft.

Even though an installation of this type is satisfactory, it is desirable to find an arrangement which ensures a good safety level in relation to any impacts by birds.

SUMMARY OF THE INVENTION

An objective of the present invention is to propose a tail fin assembly for an aircraft wherein the piping which ensures guiding of the gas, in particular dihydrogen, to the exterior of the aircraft, is protected against impacts by birds, and wherein any leakage from the piping constitutes no risk for the aircraft.

For this purpose, a tail fin assembly for an aircraft is proposed, said tail fin assembly comprising:

- a tail fin with a front side-member;
- a plurality of ribs, wherein the ribs are positioned along the front side-member, wherein each rib has a foot which is integral with the front side-member and a head which is integral with the foot;
- at least one piece of piping extending along the front side-member and at the rear of each head; and
- a housing which is secured on the heads, and covers said at least one piece of piping.

With an arrangement of this type, the heads of the ribs ensure together with the housing protection against impacts by birds, in order to protect the piping.

Advantageously, between two successive ribs, said tail fin assembly comprises a beam which is secured between the heads of said successive ribs.

Advantageously, the housing is pierced by ventilation windows.

Advantageously, the housing is pierced by at least one orifice, and, for said at least one orifice, the tail fin assembly comprises a ventilation system, which is fluidically connected to said orifice, and ensures a Venturi effect.

According to a particular embodiment, for at least one piece of piping, said tail fin assembly comprises a channel comprising a duct in which said at least one piece of piping is secured, wherein the duct is secured on the ribs, and has lateral walls which delimit an opening between one another, and extend as far as the housing, wherein the duct has a base opposite the opening.

Advantageously, the ventilation windows are in fluidic continuity with the opening.

Advantageously, the orifices are in fluidic continuity with the opening.

Advantageously, the duct comprises an intermediate floor, which separates the duct into an upper duct, in which said at least one piece of piping is secured, and a lower duct, in which air circulates, and the intermediate floor is pierced with holes.

According to another particular embodiment, there are a plurality of pieces of piping, and, for said plurality of pieces of piping, the tail fin assembly comprises a covering piece of piping in which said plurality of pieces of piping is secured, and wherein said covering piece of piping extends along the front side-member, and at the rear of each head.

Advantageously, the tail fin assembly comprises retention rings, wherein each of them is accommodated in the covering piece of piping, it surrounds said plurality of pieces of piping, and, for each piece of piping of said plurality, it has a first indentation through which said piece of piping passes, and retention inserts, wherein each of them is positioned between the pieces of piping of said plurality, and, for each piece of piping of said plurality, it has a second indentation through which said piece of piping passes.

Advantageously, the tail fin has an upper edge, said at least one piece of piping has a section which extends along said upper edge, and said tail fin assembly comprises a cage which is integral with the tail fin, and wherein said section is arranged between the tail fin and the cage.

The invention also proposes an aircraft comprising a fuselage and a tail fin assembly according to one of the preceding variants, wherein the tail fin is secured on the rear of the fuselage.

BRIEF DESCRIPTION OF THE DRAWINGS

The characteristics of the invention mentioned above, as well as others, will become more clearly apparent from reading the following description of an embodiment and its variants, said description being provided in relation with the appended drawings, in which.

DETAILED DESCRIPTION OF THE PREFERRED EMBODIMENTS

Figure 1:
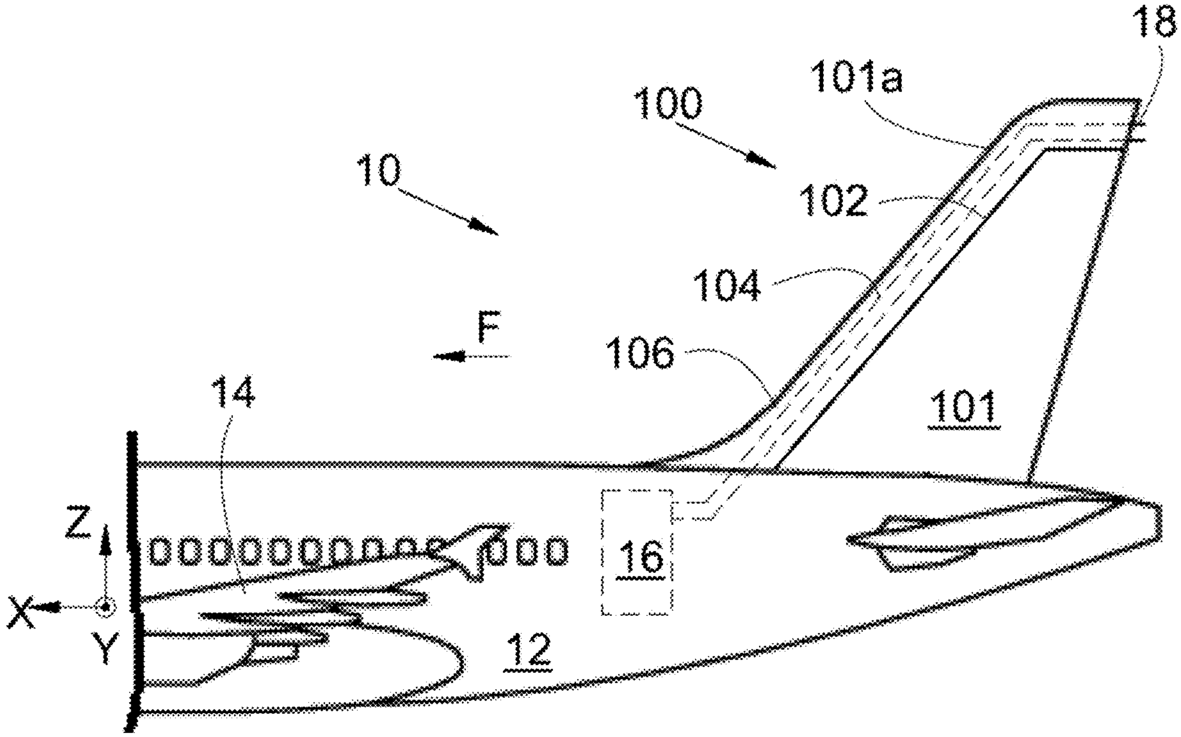
FIG. 1 is a side view of the rear of an aircraft according to the invention.

FIG. 1 shows an aircraft 10 which has a fuselage 12 on both sides of which a wing 14 is secured.

By convention, the longitudinal direction of the aircraft 10 is known as X, Y is the transverse direction of the aircraft 10 which is horizontal when the aircraft 10 is on the ground, and Z is the vertical direction or vertical height when the aircraft 10 is on the ground, these three directions X, Y and Z being orthogonal to one another.

In addition, the position terms such as "front" and "rear" are to be considered relative to a direction of advance of the aircraft 10 during the operation of the propulsion systems of the aircraft 10, this direction being represented schematically by the arrow F.

The aircraft 10 also comprises a tail fin assembly 100 according to the invention, wherein said tail fin assembly 100 comprises inter alia a tail fin 101 which is secured on the rear of the fuselage 12.

In the embodiment of the invention represented in FIG. 1, the aircraft 10 is equipped with a tank 16 containing a fluid. Although in the tank 16, the fluid can be in a liquid phase, in certain conditions it can be in a gaseous phase, such as dihydrogen. In order to ensure the discharge of the gas to the exterior of the aircraft 10 if necessary, the aircraft comprises piping 104, wherein each piece of piping is connected fluidically between the tank 16 and a nozzle 18 which opens onto the exterior of the aircraft 10, and is arranged at the rear of the tail fin 101, in particular at its trailing edge.

The tail fin 101 has a front side-member 102 and piping 104 which forms part of the tail fin assembly 100, extending at the rear of the leading edge 101*a* of the tail fin 101. The front side-member 102 extends globally vertically, and the tail fin 101 also comprises a housing 106 which covers the front side-member 102, and bears the leading edge 101*a*.

In general, there is at least one piece of piping 104. The front side-member 102 extends from the front to the rear, progressing from bottom to top, i.e. from the fuselage 12.

Figure 2:
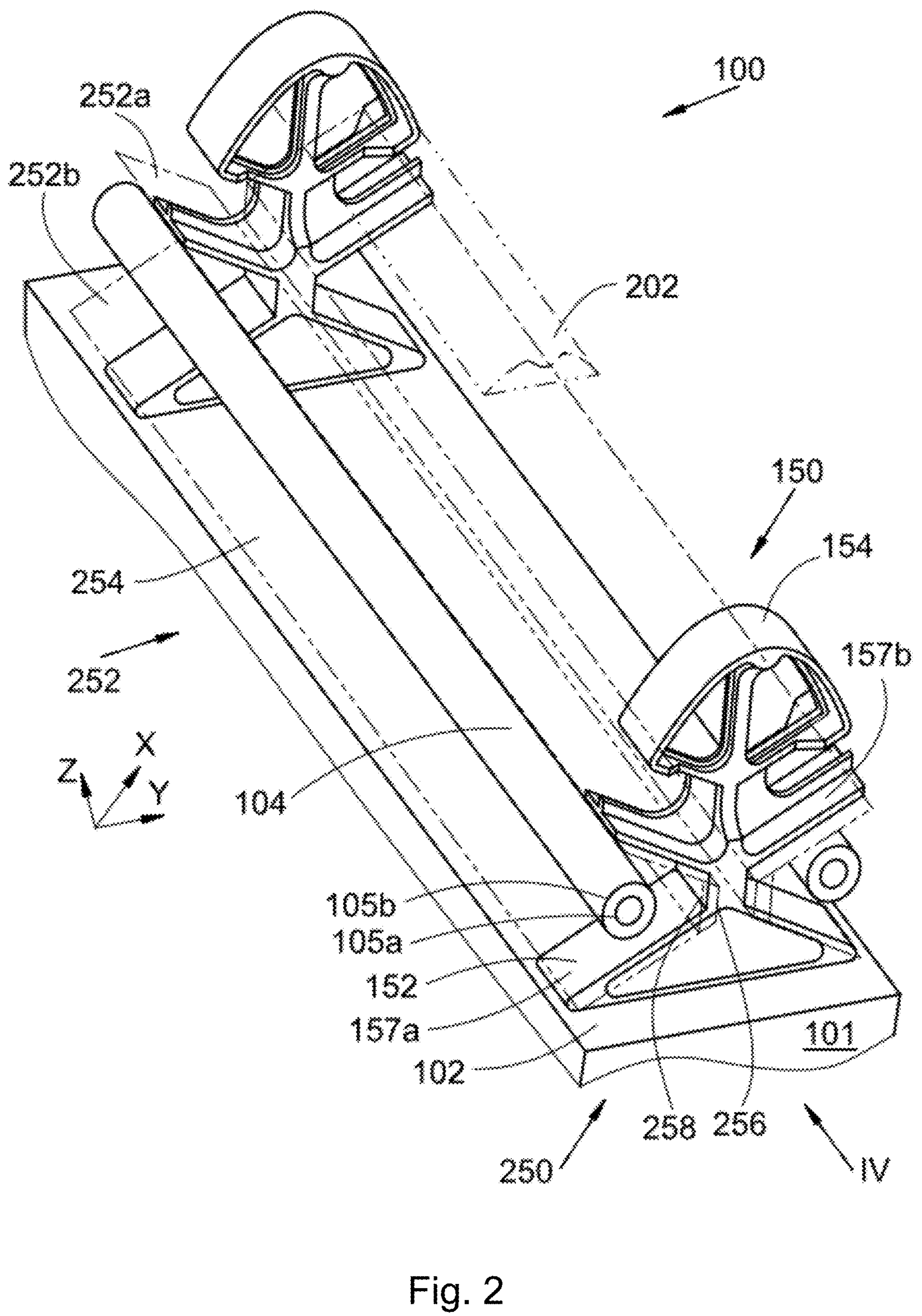
FIG. 2 is a view in perspective of a tail fin assembly according to a first embodiment of the invention.

FIG. 2 shows the tail fin assembly 100 installed along the front side-member 102 at the rear of the leading edge 101*a* without the housing 106, for better visibility.

Figure 3:
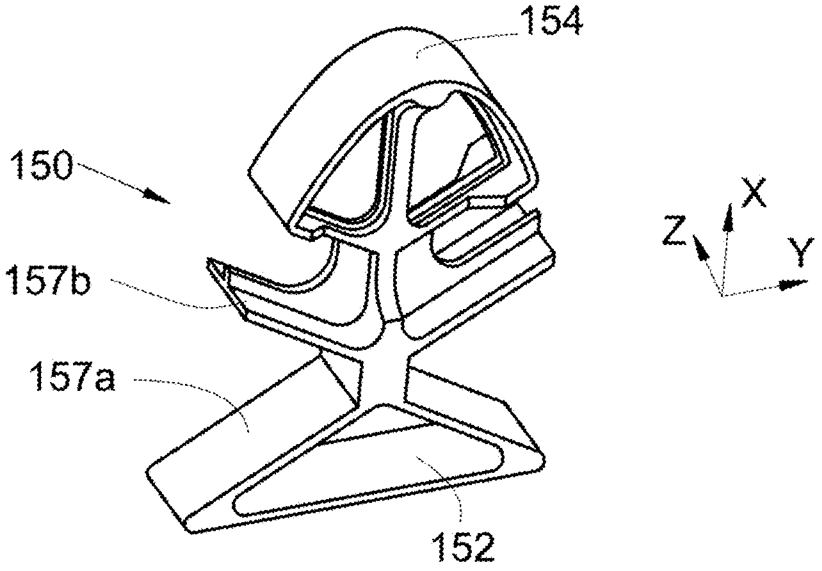
FIG. 3 is a view in perspective of a rib used in a tail fin assembly according to the first embodiment of the invention.

The tail fin assembly 100 also comprises a plurality of ribs 150 (in this case only two ribs 150 are represented), wherein the ribs 150 are positioned along the front side-member 102 of the tail fin 101. FIG. 3 shows a rib 150, and each rib 150 has a foot 152 which is integral with the front side-member 102. The foot 152 is secured by any appropriate means such as nut and bolt elements, rivets, adhesive, etc. The rib 150 also comprises a head 154 which is integral with the foot 152, and projects forwards relative to the front side-member 102. The ribs 150 are at the front of the front side-member 102.

As shown in FIG. 2, the piping 104 is at the rear of the heads 154, i.e. between the foot 152 and the head 154 of each rib 150. Each piece of piping 104 is thus at the front relative to the front side-member 102, and runs along this member and at the rear of the heads 154 and the housing 106.

Each head 154 ensures a structural reinforcement for the housing 106, and protection against impacts by birds for the piping 104 which is to the rear relative to the direction of advance F.

Figure 4:
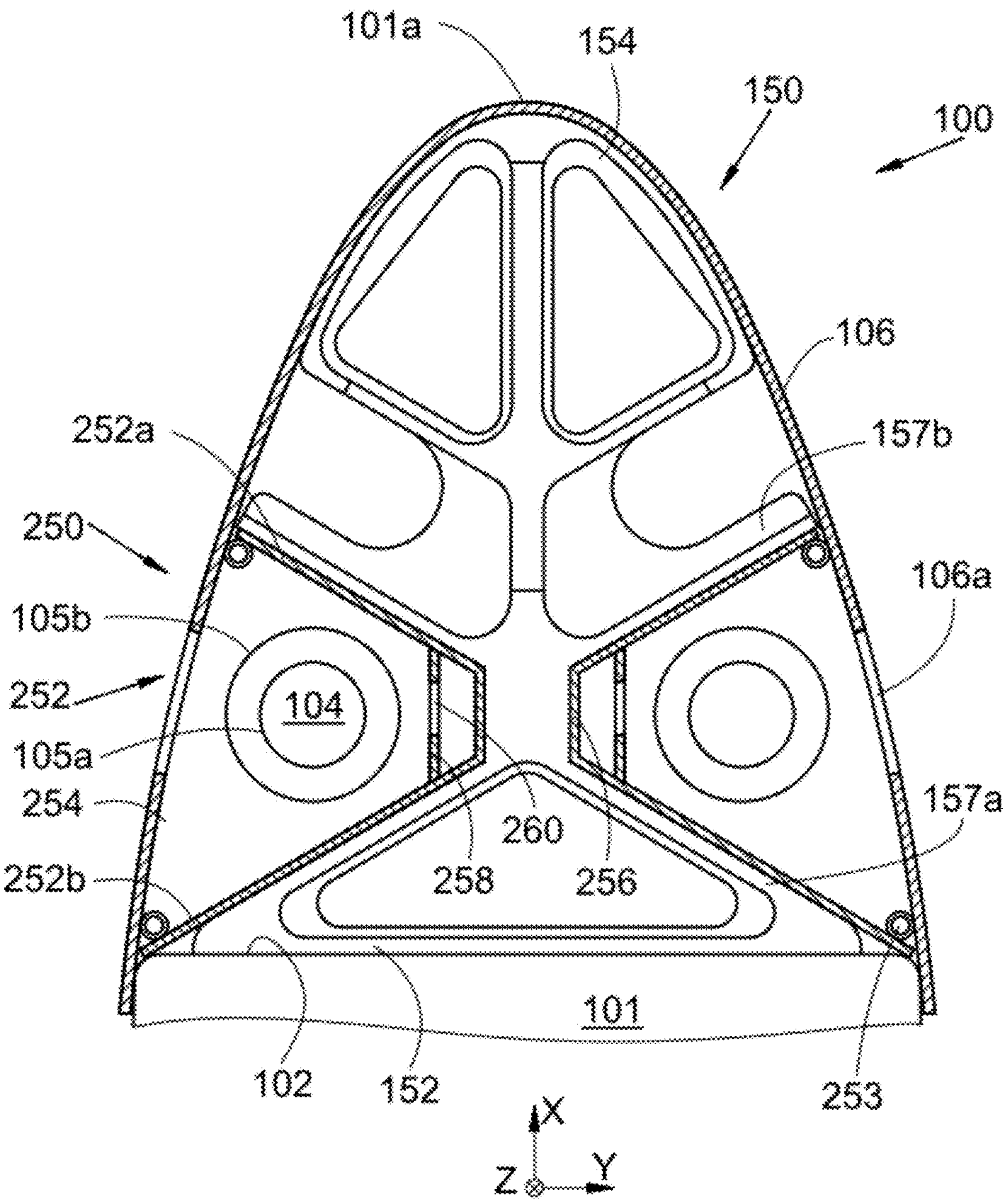
FIG. 4 is a view of the tail fin assembly of FIG. 2 according to the arrow IV.

As shown in FIG. 4, the tail fin assembly 100 also comprises the housing 106, which is secured on the heads 154 and covers them. The housing 106 provides the aerodynamic function, and, together with the heads 154, ensures the protection against impacts by birds. The housing 106 thus covers the piping 104, the ribs 150 and the front side-member 102, and thus, preferably, the housing 106 has an aerodynamic profile and envelops the front side-member 102.

The head 154 and the foot 152 can constitute a single element which is in a single piece, and is made of a single material, but they can also constitute two elements which are secured to one another, and can be constituted for example by different materials, in order to adapt the mechanical strength of each of them to its own function. For example, the head can be in the form of a metal arch.

Each rib 150 extends from the rear to the front from its foot 152 which is secured on the front side-member 102, and its head 154 projects forwards from the front side-member 102 of the tail fin 101.

In order to limit the risks of leakages of the piping 104, in particular in the case of dihydrogen, each piece of piping 104 preferably has a double skin, with an interior skin 105*a* and an exterior skin 105*b* around the interior skin 105*a* in which the gas circulates.

In order to reinforce the protection against the impacts between two successive ribs 150, the tail fin assembly 100 comprises, between the two ribs 150, a beam 202 which is secured between the heads 154 of said ribs 150. In FIG. 2, only a portion of the beam 202 is represented in dot and dash lines at two points. Each end of the beam 202 is secured on a head 154 by any appropriate securing means. The beam 202 can also be in a single piece with at least one of the ribs 150.

The piping 104 is thus at the rear of the beam 202, and the housing 106 also covers the beam 202.

Figure 5:
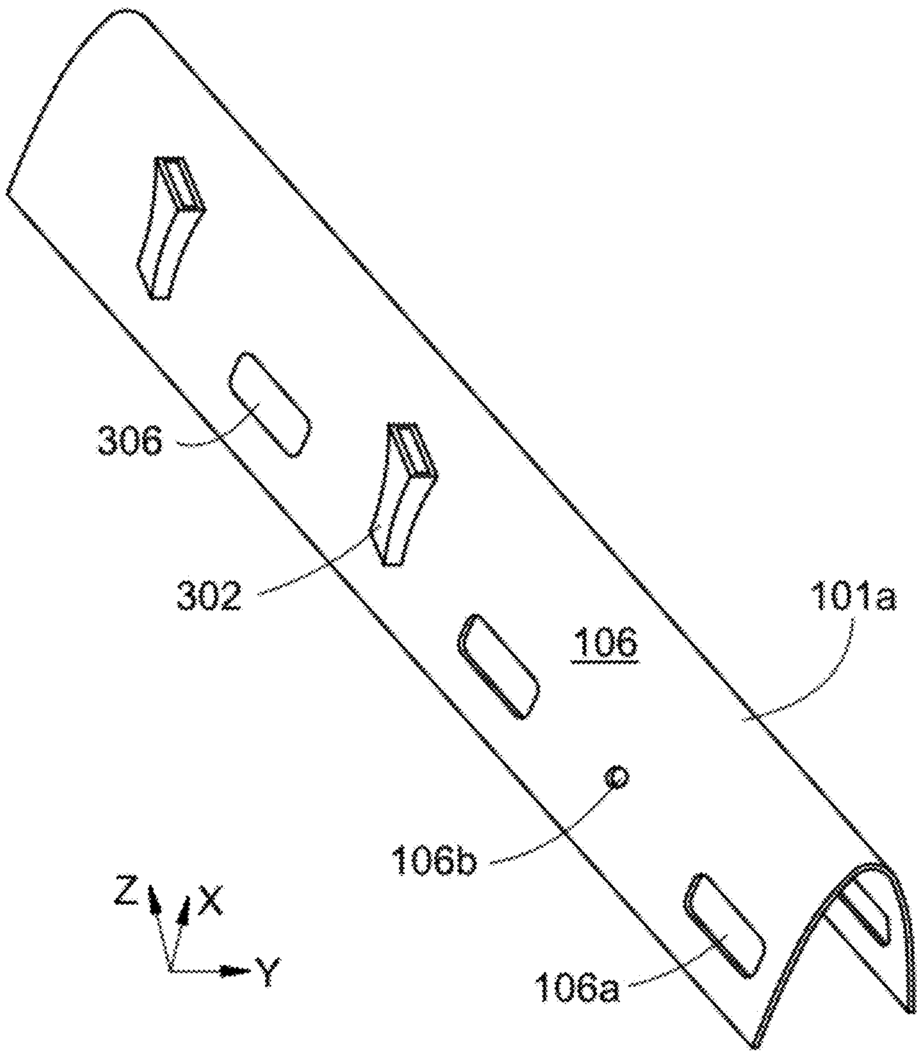
FIG. 5 is a view in perspective of a housing used in a tail fin assembly according to the invention.

As shown more clearly in FIG. 5, the housing 106 is pierced, at the rear of the leading edge 101*a*, with ventilation windows 106*a*, which improve the ventilation in the interior of said housing 106, and the discharge of the gas in the case of a leakage.

In order to improve further the discharge of the gas, the housing 106 is pierced with at least one orifice 106*b*, and, for each orifice 106*b*, the tail fin assembly 100 comprises a ventilation system 302, which is secured on the exterior of the housing 106, and is fluidically connected to the orifice 106*b*.

Figure 6:
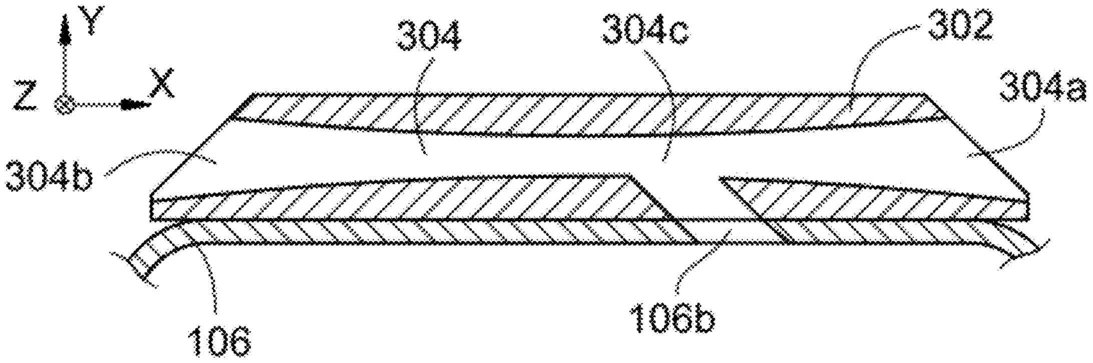
FIG. 6 is a view in cross-section of a ventilation system which ensures a Venturi effect, and is used in a tail fin assembly according to the invention.

FIG. 6 shows a cross-section of the ventilation system 302 which ensures a Venturi effect.

In this case, the ventilation system 302 has a duct 304 with an inlet 304*a* and an outlet 304*b*, wherein the inlet 304*a* is oriented towards the front of the aircraft 10, and wherein the outlet is oriented towards the rear of the aircraft 10. Between the inlet 304*a* and the outlet 304*b*, the duct has an intermediate area 304*c*, the cross-section of which is smaller than the cross-section of the inlet 304*a* and than the cross-section of the outlet 304*b*. The orifice 106*b* is fluidically connected to the intermediate area 304*c*.

In the first embodiment of the invention, for each piece of piping 104, the tail fin assembly 100 comprises a channel 250 which comprises a duct 252 in which the piping 104 is secured. It will be appreciated that, in general, this applies to at least one piece of piping 104. The piping 104 is secured by any appropriate securing means, for example by means of braces and clamping flanges.

The duct 252 is secured on the ribs 150 by any appropriate securing means, and it has two lateral walls 252*a-b* which delimit between one another an opening 254. The lateral walls 252*a-b* extend as far as an interior face of the housing 106.

In this case, there is a channel 250 on both sides, and each duct 252 thus forms together with the housing 106 a closed volume in order to contain any leakage from a piece of piping 104.

In order to limit better still the risks of flow of the gas between the lateral walls 252*a-b* and the housing 106, seals 253 are provided at the interfaces between the lateral walls 252*a-b* and the housing 106. In this case, each seal 253 is in the form of a bead.

Opposite the opening 254, the duct 252 has a base 256.

In this case, each lateral wall 252*a-b* is supported against a wall of the rib 150, in particular a lower wall 157*a* of the foot 152, and an upper wall 157*b* between the foot 152 and the head 154. Each channel 250 thus extends along the front side-member 102.

In this embodiment, the ventilation windows 106*a* are in fluidic continuity with the opening 254 which is on the same side and in the same manner, and the orifices 106*b* are in fluidic continuity with the opening 254 which is on the same side.

In order to limit the impact of the ventilation windows 106*a* on the drag of the aircraft 10 in flight, each ventilation window 106*a* is closed by a stopper 306 made of material which is breathable for the dihydrogen, i.e., the stopper 306 is impermeable to exterior water which cannot penetrate into the channel 250, and permeable, inter alia, for the dihydrogen which is present in the channel 250, and can be discharged to the exterior. The stopper 306 is for example made of polypropylene or polyethylene.

In case of fire, in order to prevent the fire from remaining confined in the channel 250 as a result of the presence of the stoppers 306, each stopper 306 is constituted by a material which can break under the effect of heat, such as, for example, polypropylene or polyethylene. By breaking under the effect of heat, the stopper 306 constitutes a fuse which makes it possible to open the ventilation window 106*a* if necessary in order to snuff the flames. In particular, the material for the stopper 306 is selected so as to break when the temperature in the interior of the duct 252 reaches a value lower than the maximal temperature acceptable for the duct 252 and the piping 104 installed in the duct 252, i.e. the temperature starting from which the intactness of the duct 252 and of the piping 104 is no longer guaranteed.

In the case of excess pressure, it is also possible for the cover 306 to break under the effect of the excess pressure, thus limiting the risks of breakage of the duct 252. For this purpose, the resistance to tearing of the cover 306 is lower than the resistance to tearing of the duct 252, for example by means of the creation of thinner areas.

In the embodiment of the invention presented here, the duct 252 comprises an intermediate floor 258 which is spaced from the base 256, and separates the duct 252 into an upper duct, in which the piping 104 is secured, and a lower duct, in which there circulates air, coming for example from a ventilation system. The upper duct extends between the intermediate floor 258 and the housing 106, and the lower duct extends between the base 256 and the intermediate floor 258.

In order to permit the passage of the air from the lower duct to the upper duct, the intermediate floor 258 is pierced with holes 260 which, according to their arrangement, make it possible to ensure homogenous ventilation of the upper duct.

In the second embodiment represented in FIGS. 7 to 10, the double-skin piping 104 is replaced by single-skin piping which is enclosed in covering piping 702 (in this case in dot-and-dash lines). An arrangement of this type makes possible a saving of space, since the size of single-skin piping in covering piping is smaller than the size of double-skin piping.

In the embodiment of the invention represented here, there are three pieces of piping 104.

Thus, the tail fin assembly 100 comprises the covering piping 702 in which the plurality of pieces of piping 104 is mounted and secured. The covering piping 702 extends along the front side-member 102 and at the rear of each head 154.

The covering piping 702 thus passes through each rib 150, and is secured thereto by appropriate securing means 708.

In this case, the securing means 708 are in the form of fingers 708*a*, which are resilient, integral with the rib 150, and distributed around the periphery of the covering piping 702. The fingers 708*a* are supported against the covering piping 702. The covering piping 702 can be put under vacuum, or filled with an inert gas with the dihydrogen.

Although the ventilation windows 106*a* and the ventilation system 302 have been explained in the first embodiment, they can be put into place in the same manner on the second embodiment.

Figure 7:
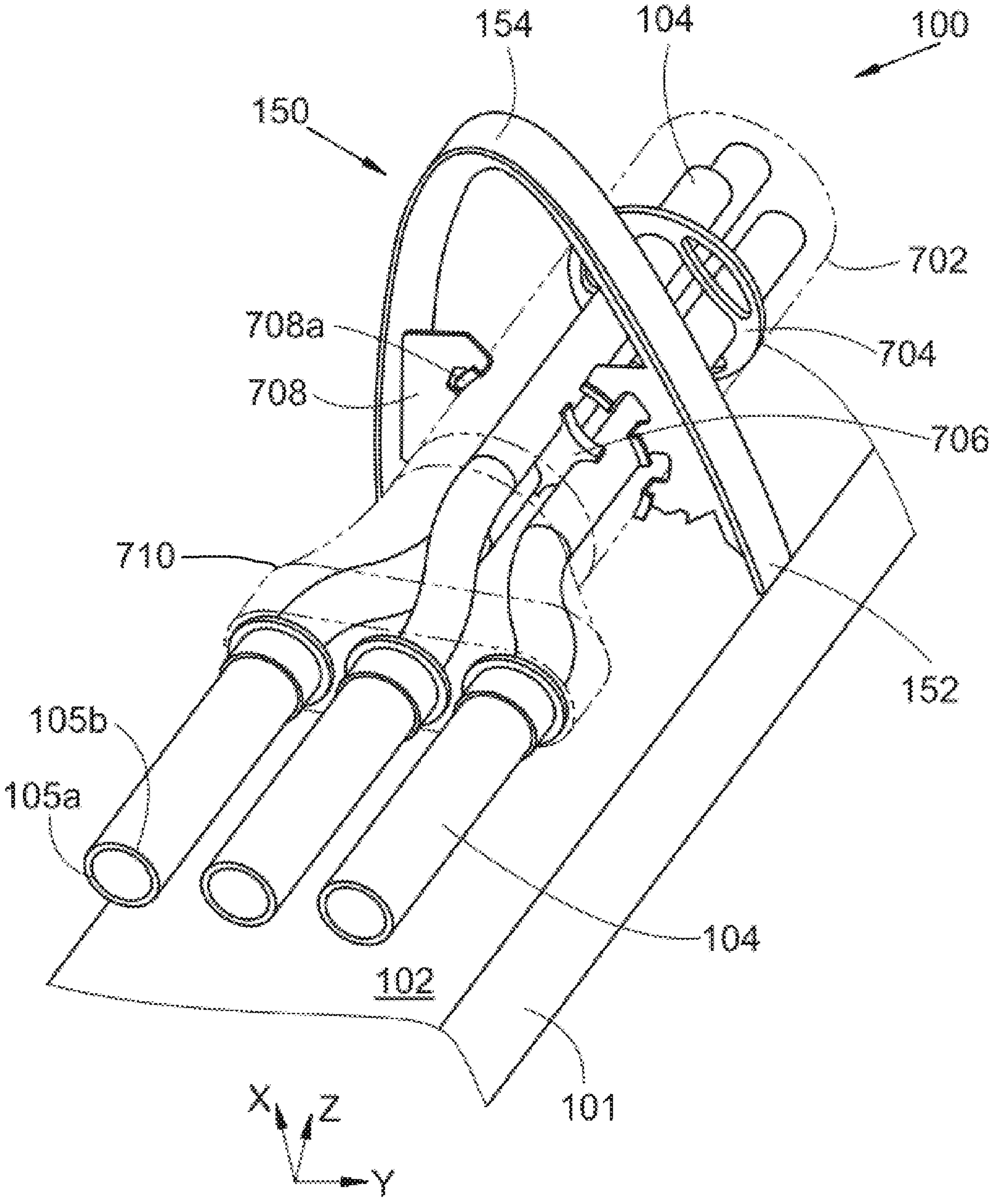
FIG. 7 is a view of a tail fin assembly according to a second embodiment of the invention.
Figure 8:
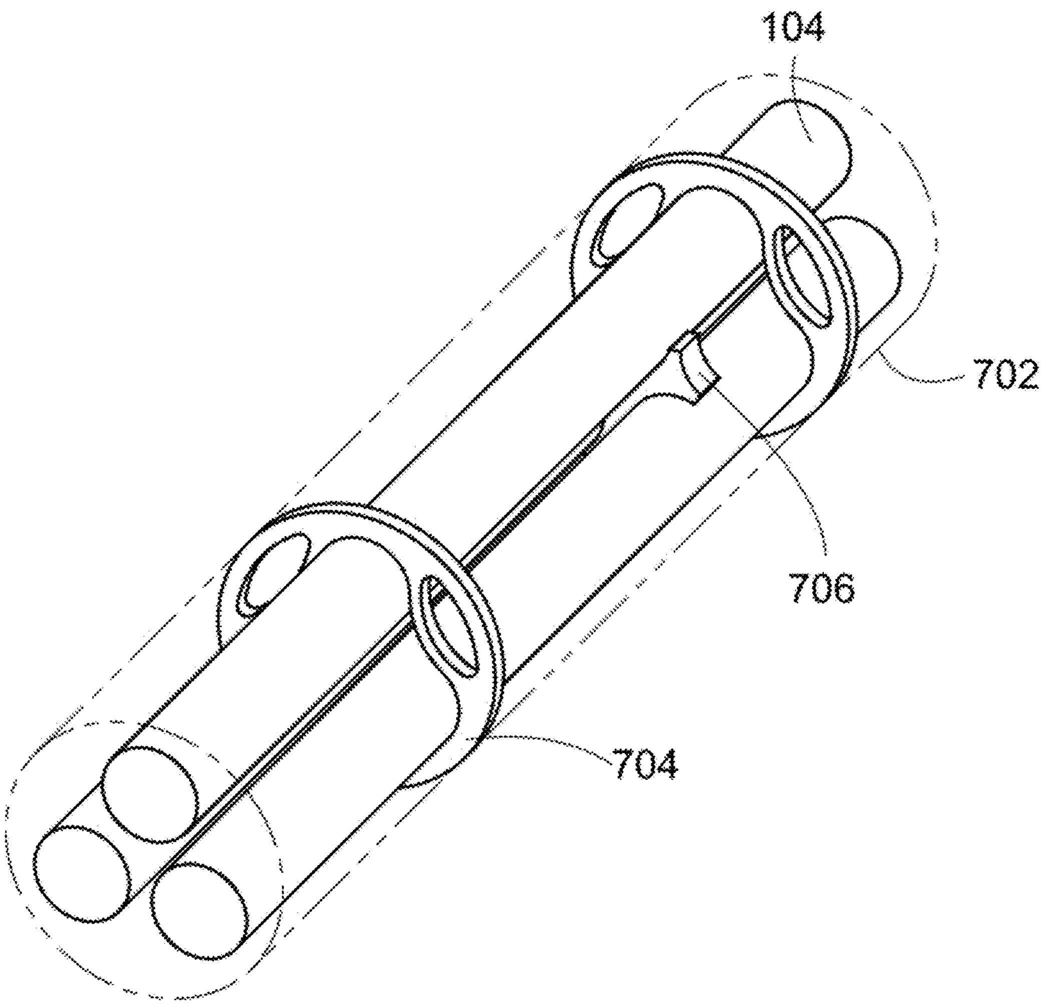
FIG. 8 is a view in perspective of part of the tail fin assembly of FIG. 7.

In the embodiment of the invention represented in FIG. 7, the tail fin assembly 100 comprises a concentration casing 710 (in dot-and-dash lines), which closes the covering piping 702 at its lower end. In the direction of flow of the gas in the piping 104, upstream from the concentration casing 710, the piping 104 is double-skin, and downstream from the concentration casing 710, the piping 104 is single-skin. The concentration casing 710 forms the second skin of the piping 104, like the covering piping 702.

Thus, the interior skin 105*a* of the double-skin piping 104 becomes the skin of the single-skin piping 104, by passing in a sealed banner through a wall of the concentration casing 710, whereas the exterior skin 105*b* of the double-skin piping 104 is secured in a sealed manner on a wall of the concentration casing 710.

In order to ensure the securing of the piping 104 in the covering piping 702, the tail fin assembly 100 is equipped with securing means, which in this case comprise retention rings 704 and retention inserts 706. There is a plurality of retention rings 704 and retention inserts 706 distributed along the length of the covering piping 702. There is a retention ring 704 between two retention inserts 706, and a retention insert 706 between two retention rings 704.

Figure 9:
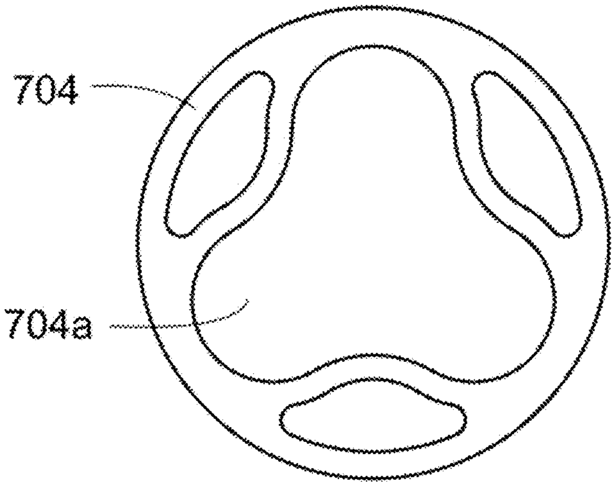
FIG. 9 is a front view of a retention ring used in a tail fin assembly according to the second embodiment of the invention.
Figure 10:
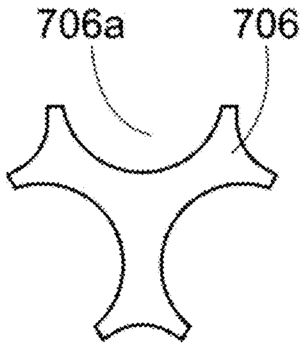
FIG. 10 is a front view of a retention insert used in tail fin assembly according to the second embodiment of the invention.

FIG. 9 shows the retention rings 704 and FIG. 10 shows the retention insert 706.

In this case, each retention ring 704 has a circular form adapted to the interior diameter of the covering piping 702, in order to be inserted therein easily. Each retention ring 704 is thus accommodated in the covering piping 702, and surrounds the plurality of pieces of piping 104. In order to permit the passage of each piece of piping 104 in the retention rings 704, for each piece of piping 104 this ring has a first indentation 704*a* through which the piping 104 passes. The indentations 704*a*, of which there are three in this case, are all open towards the interior of the retention ring 704, and thus communicate.

Each retention insert 706 is also accommodated in the covering piping 702, and takes the form of a star positioned between the pieces of piping 104. Each branch of the star is inserted between two adjacent pieces of piping 104, and between two adjacent branches there is arranged a second indentation 706*a*, through which a piece of piping 104 passes. Each retention insert 706 thus has for each piece of piping 104 a second indentation 706*a*, through which the piping 104 passes. Each second indentation 706*a* is open towards the exterior.

Figure 11:
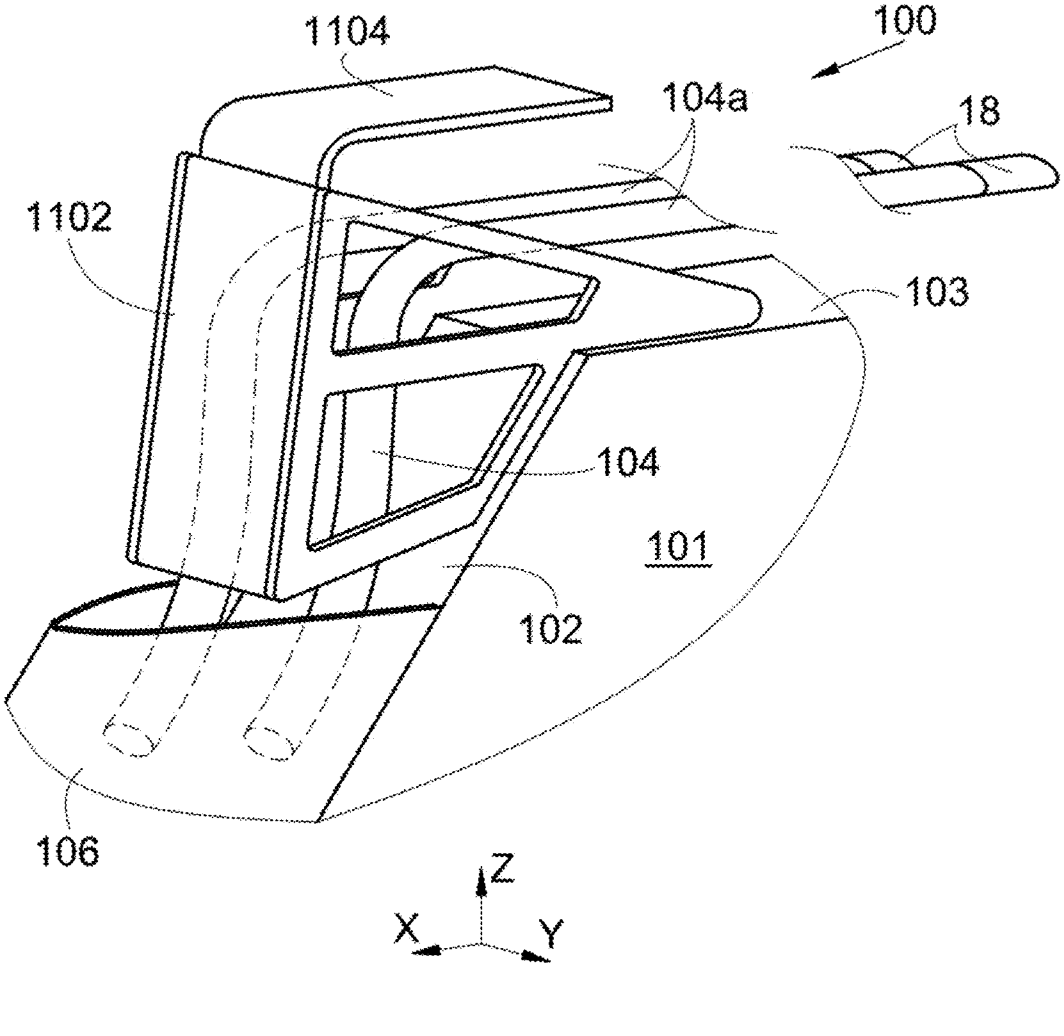
FIG. 11 is a view in perspective of a cage used in a tail fin assembly according to the invention.

FIG. 11 shows a particular arrangement which can be implemented within the context of the first or second embodiments.

This particular arrangement is implemented at an upper edge 103 of the tail fin 101. The piping 104 which borders the front side-member 102 curves above the upper edge 103 in order to continue as far as the rear of the tail fin 101, and reach the nozzles 18. Each piece of piping 104 thus has a section 104*a* which extends along the upper edge 103.

In order to protect the sections 104*a*, in particular against impacts by birds, the tail fin assembly 100 comprises a cage 1102 which is integral with the tail fin 101, to which it is secured by any appropriate securing means. Each section 104*a* is arranged between the tail fin 101 and the cage 1102 which protects it, inter alia, against impacts by birds. The cage 1102 is in the form of a wedge secured at the intersection of the front side-member 102 and the upper edge 103, and it is equipped with an extension 1104 which extends above the sections 104*a* and the upper edge 103.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tail fin assembly for an aircraft, the tail fin assembly comprising:
- a tail fin with a front side-member;
- a plurality of ribs, wherein the ribs of the plurality of ribs are positioned along the front side-member, wherein each rib from the plurality of ribs has a foot integral with the front side-member and a head integral with the foot;
- at least one piece of piping extending along the front side-member and at the rear of each head; and
- a housing which is secured on the heads and which covers said at least one piece of piping,
- wherein the tail fin assembly further comprises a channel comprising a duct in which said at least one piece of piping is secured,
- wherein the duct is secured on the ribs of the plurality of ribs and has lateral walls which delimit an opening between one another, and extend as far as the housing,
- wherein the duct has a base opposite the opening.

2. The tail fin assembly as claimed in claim 1, wherein, between two successive ribs of the plurality of ribs, said tail fin assembly further comprises a beam secured between the heads of the two successive ribs.

3. The tail fin assembly as claimed in claim 1, wherein the housing is pierced by ventilation windows.

4. The tail fin assembly as claimed in claim 3, wherein the ventilation windows are in fluidic continuity with the opening.

5. The tail fin assembly as claimed in claim 1, wherein the housing is pierced by at least one orifice, and the tail fin assembly further comprises a ventilation system which is fluidically connected to said at least one orifice and ensures a Venturi effect.

6. The tail fin assembly as claimed in claim 5, wherein the at least one orifice is in fluidic continuity with the opening.

7. The tail fin assembly as claimed in claim 1, wherein the duct comprises an intermediate floor which separates the duct into an upper duct, in which said at least one piece of piping is secured, and a lower duct, in which air circulates, and
- wherein the intermediate floor is pierced with holes.

8. The tail fin assembly as claimed in claim 1, wherein the tail fin has an upper edge,
- wherein said at least one piece of piping has a section which extends along said upper edge,
- wherein said tail fin assembly further comprises a cage integral with the tail fin, and
- wherein said section of said at least one piece of piping is arranged between the tail fin and the cage.

9. An aircraft comprising:
- a fuselage; and
- the tail fin assembly as claimed in claim 1,
- wherein the tail fin is secured on the rear of the fuselage.

10. A tail fin assembly for an aircraft, the tail fin assembly comprising:
- a tail fin with a front side-member;
- a plurality of ribs, wherein the ribs of the plurality of ribs are positioned along the front side-member, wherein each rib of the plurality of ribs has a foot integral with the front side-member and a head integral with the foot;
- at least one piece of piping extending along the front side-member and at the rear of the heads; and
- a housing secured on the heads and covering the at least one piece of piping,
- wherein there are a plurality of pieces of piping,
- wherein the tail fin assembly further comprises a covering piece of piping in which said plurality of pieces of piping is secured, and
- wherein said covering piece of piping extends along the front side-member and at the rear of each head.

11. The tail fin assembly as claimed in claim 10, further comprising:
- retention rings, wherein each retention ring is accommodated in the covering piece of piping and surrounds said plurality of pieces of piping, and,
- wherein each retention ring has a first indentation through which said piece of piping passes and retention inserts,
- wherein each retention insert is positioned between the pieces of piping of said plurality of pieces of piping, and,
- wherein each retention insert has a second indentation through which said piece of piping passes.

* * * * *